United States Patent
Kim et al.

(10) Patent No.: US 10,276,887 B2
(45) Date of Patent: Apr. 30, 2019

(54) FLEXIBLE BATTERY CELL

(71) Applicant: LG Chem, Ltd., Seoul (KR)

(72) Inventors: Seong Min Kim, Daejeon (KR); Jin Soo Lee, Daejeon (KR); Joo Hwan Sung, Daejeon (KR); Sung Pil Yoon, Daejeon (KR); Jung Koo Kang, Daejeon (KR); Ju Bin Kim, Daejeon (KR); Hae Jin Lim, Daejeon (KR); Seunghe Woo, Daejeon (KR)

(73) Assignee: LG Chem, Ltd. (KR)

( * ) Notice: Subject to any disclaimer, the term of this patent is extended or adjusted under 35 U.S.C. 154(b) by 183 days.

(21) Appl. No.: 15/102,958

(22) PCT Filed: Jan. 5, 2015

(86) PCT No.: PCT/KR2015/000048
§ 371 (c)(1),
(2) Date: Jun. 9, 2016

(87) PCT Pub. No.: WO2015/102442
PCT Pub. Date: Jul. 9, 2015

(65) Prior Publication Data
US 2016/0308241 A1 Oct. 20, 2016

(30) Foreign Application Priority Data
Jan. 6, 2014 (KR) .......................... 10-2014-0001125

(51) Int. Cl.
*H01M 2/02* (2006.01)
*H01M 4/02* (2006.01)
(Continued)

(52) U.S. Cl.
CPC ..... *H01M 10/0436* (2013.01); *H01M 2/0207* (2013.01); *H01M 2/0275* (2013.01);
(Continued)

(58) Field of Classification Search
CPC ............ H01M 2/0207; H01M 2/0275; H01M 2/0287; H01M 2/026; H01M 4/13;
(Continued)

(56) References Cited

U.S. PATENT DOCUMENTS

| | | | |
|---|---|---|---|
| 5,587,253 A | 12/1996 | Gozdz et al. | |
| 6,110,622 A | * 8/2000 | Frysz | .................... H01M 4/661 |
| | | | 429/231.9 |

(Continued)

FOREIGN PATENT DOCUMENTS

| JP | H10510669 A | 10/1998 |
|---|---|---|
| JP | 200176732 | 3/2001 |

(Continued)

OTHER PUBLICATIONS

J-PlatPat machine translation of the detailed description of 2012-227067A (Year: 2012).*

(Continued)

*Primary Examiner* — Gregg Cantelmo
(74) *Attorney, Agent, or Firm* — Lerner, David, Littenberg, Krumholz & Mentlik, LLP (57) ABSTRACT

Disclosed herein is a battery cell having an electrode assembly including one or more unit cells mounted in a variable cell case in a state in which the electrode assembly is impregnated with an electrolyte, wherein at least one of the unit cells includes a flexible electrode that can be bent or curved, an electrode current collector of the flexible electrode includes a first surface, to which an electrode active material is applied, and a second surface, to which no electrode active material is applied, the second surface being opposite to the first surface, and the second surface is provided with a mesh for improving flexibility of the electrode.

17 Claims, 9 Drawing Sheets

(51) Int. Cl.
  *H01M 4/13* (2010.01)
  *H01M 4/74* (2006.01)
  *H01M 4/80* (2006.01)
  *H01M 10/04* (2006.01)
  *H01M 10/052* (2010.01)
  *H01M 10/0525* (2010.01)
  *H01M 10/0583* (2010.01)

(52) U.S. Cl.
  CPC ........... *H01M 2/0287* (2013.01); *H01M 4/13* (2013.01); *H01M 4/74* (2013.01); *H01M 4/742* (2013.01); *H01M 4/80* (2013.01); *H01M 10/045* (2013.01); H01M 2/026 (2013.01); H01M 10/052 (2013.01); H01M 10/0525 (2013.01); H01M 10/0583 (2013.01); H01M 2004/021 (2013.01); H01M 2220/30 (2013.01)

(58) Field of Classification Search
  CPC ......... H01M 4/74; H01M 4/742; H01M 4/80; H01M 10/0436; H01M 10/052; H01M 10/0525; H01M 10/0583; H01M 2004/021; H01M 2220/30
  See application file for complete search history.

(56) References Cited

U.S. PATENT DOCUMENTS

| | | | | |
|---|---|---|---|---|
| 6,461,769 | B1* | 10/2002 | Ando | H01M 4/137 429/128 |
| 6,664,005 | B2* | 12/2003 | Kezuka | H01M 2/0212 29/2 |
| 7,122,275 | B2* | 10/2006 | Woehrle | H01M 2/08 429/159 |
| 2006/0110661 | A1* | 5/2006 | Lee | H01M 4/661 429/233 |
| 2008/0050656 | A1 | 2/2008 | Eisenbeiser | |
| 2008/0060189 | A1* | 3/2008 | Daidoji | H01M 2/021 29/623.1 |
| 2009/0325066 | A1 | 12/2009 | Kwon et al. | |
| 2010/0167111 | A1 | 7/2010 | Sumihara et al. | |
| 2011/0281152 | A1 | 11/2011 | He et al. | |
| 2012/0202101 | A1* | 8/2012 | Ueda | H01M 2/021 429/127 |
| 2013/0101884 | A1* | 4/2013 | Ueda | H01M 10/052 429/127 |
| 2013/0143090 | A1 | 6/2013 | Hosoya et al. | |
| 2013/0177798 | A1* | 7/2013 | Ueda | H01M 10/052 429/127 |
| 2013/0260205 | A1* | 10/2013 | Kwon | H01M 10/04 429/127 |

FOREIGN PATENT DOCUMENTS

| | | | | |
|---|---|---|---|---|
| JP | 2002343340 | A | | 11/2002 |
| JP | 2003059486 | A | | 2/2003 |
| JP | 2010238403 | A | | 10/2010 |
| JP | 2012227067 | A * | 11/2012 | ............ B21D 13/04 |
| KR | 20060102854 | A | | 9/2006 |
| KR | 20090077131 | A | | 7/2009 |
| KR | 20100000655 | A | | 1/2010 |
| KR | 20110033502 | A | | 3/2011 |
| KR | 20120131779 | A | | 12/2012 |

OTHER PUBLICATIONS

Extended Search Report from European Application No. 15733281.8, dated Oct. 21, 2016.
International Search Report from PCT/KR2015/000048, dated Apr. 1, 2015.

* cited by examiner

FLEXIBLE BATTERY CELL

CROSS-REFERENCE TO RELATED APPLICATION

This application is a national phase entry under 35 U.S.C. § 371 of International Application No. PCT/KR2015/000048, filed Jan. 5, 2015, which claims priority to Korean Patent Application No. 10-2014-0001125, filed Jan. 6, 2014, the disclosures of which are incorporated herein by reference.

TECHNICAL FIELD

The present invention relates to a flexible battery cell that exhibits high flexibility.

BACKGROUND ART

With remarkable development of information technology (IT), a great variety of portable information communication devices has been popularized. As a result, in the 21$^{st}$ century, we are moving toward a ubiquitous society in which high-quality information service is possible regardless of time and place.

Lithium secondary batteries are very important to realize such a ubiquitous society. Specifically, lithium secondary batteries, which can be charged and discharged, have been widely used as an energy source for wireless mobile devices. In addition, the lithium secondary batteries have also been used as an energy source for electric vehicles and hybrid electric vehicles, which have been proposed to solve problems, such as air pollution, caused by existing gasoline and diesel vehicles using fossil fuel.

As devices, to which the lithium secondary batteries are applicable, are diversified as described above, the lithium secondary batteries have also been diversified such that the lithium secondary batteries can provide outputs and capacities suitable for devices to which the lithium secondary batteries are applied. In addition, there is a strong need to reduce the size and weight of the lithium secondary batteries.

Based on the shape thereof, the lithium secondary batteries may be classified into a cylindrical battery cell, a prismatic battery cell, and a pouch-shaped battery cell. Among these kinds of lithium secondary batteries, much interest is currently focused on the pouch-shaped battery cell, which can be stacked with high integration, has high energy density per unit volume, can be manufactured at low cost, and can be easily modified.

Figure 1:
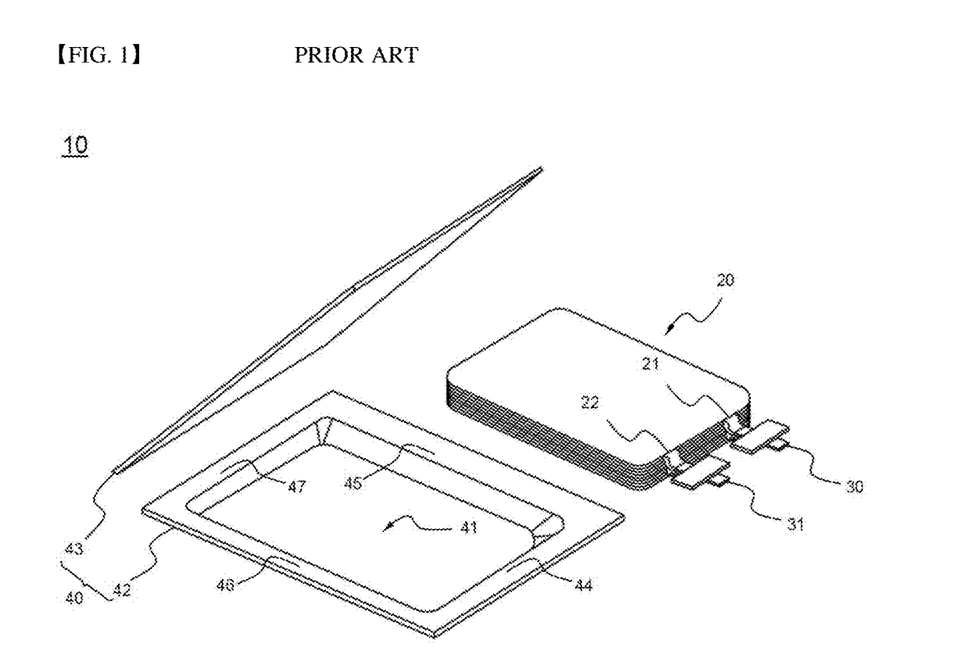
FIGS. 1 and 2 are exploded perspective views showing a conventional representative pouch-shaped secondary battery.
Figure 2:
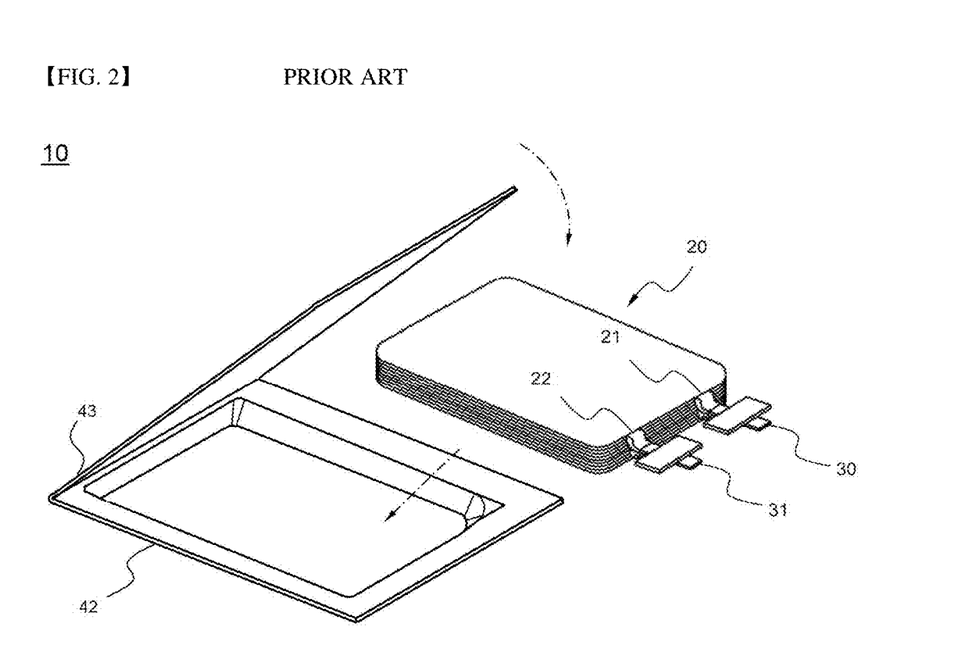

FIGS. 1 and 2 are exploded perspective views typically showing a general structure of a conventional representative pouch-shaped secondary battery.

Referring to FIG. 1, a pouch-shaped secondary battery 10 includes a stacked type electrode assembly 20 having pluralities of electrode tabs 21 and 22 protruding therefrom, two electrode leads 30 and 31 respectively connected to the electrode tabs 21 and 22, and a battery case 40, in which the stacked type electrode assembly 20 is received in a sealed state such that the electrode leads 30 and 31 are partially exposed outward from the battery case 40.

The battery case 40 includes a lower case 42 having a depressed receiving part 41, in which the stacked type electrode assembly 20 is located, and an upper case 43 for covering the lower case 42 such that the electrode assembly 20 is sealed in the battery case 40. The upper case 43 and the lower case 42 are connected to each other by thermal welding in a state in which the stacked type electrode assembly 20 is mounted therein to form an upper end sealed part 44, side sealed parts 45 and 46, and a lower end sealed part 47.

As shown in FIG. 1, the upper case 43 and the lower case 42 may be configured as separate members. As shown in FIG. 2, on the other hand, one end of the upper case 43 may be integrally formed at a corresponding end of the lower case 42 such that the upper case 43 and the lower case 42 may be hingedly connected to each other.

In addition, as shown in FIGS. 1 and 2, the pouch-shaped battery cell is configured to have a structure in which electrode terminals constituted by the electrode tabs and the electrode leads connected to the electrode tabs are formed at one end of the electrode assembly. Alternatively, a pouch-shaped battery cell configured to have a structure in which electrode terminals are formed at one end and the other end of an electrode assembly may also be manufactured using the above-described method.

Meanwhile, FIGS. 1 and 2 show the pouch-shaped battery cell having the stacked type electrode assembly. Alternatively, a pouch-shaped battery cell having a wound type or jelly-roll type electrode assembly may also be manufactured using the above-described method.

As shown in FIGS. 1 and 2, the pouch-shaped battery cell is generally configured to have an approximately rectangular hexahedral shape.

However, devices, to which the pouch-shaped battery cell is applied, may be configured to have various shapes other than a rectangular hexahedral shape. The devices may even be configured to have a curved shape. For example, sides of a smart phone may be curved so as to be easier to grip, and a flexible display device may be curved or bent. That is, the flexible display device may be manufactured to have various shapes.

In a case in which a battery cell or a battery pack configured to have a rectangular hexahedral shape is mounted in a device designed so as to have such curved parts or a device that can be curved, however, the efficiency of utilization of the space in the device may be lowered. In recent years, it has been required for the battery cell to be flexible such that the battery cell can be easily mounted in devices configured to have various kinds of designs.

Therefore, there is a high necessity for technology that is capable of securing safety of a battery even when the battery is deformed while solving the above problems.

DISCLOSURE

Technical Problem

The present invention has been made to solve the above problems and other technical problems that have yet to be resolved.

As a result of a variety of extensive and intensive studies and experiments to solve the problems as described above, the inventors of the present application have found that, in a case in which an electrode assembly including a flexible electrode is applied to a battery cell, it is possible to easily deform the battery cell in response to a device having various designs and to secure the safety of the battery cell even when the battery cell is deformed. The present invention has been completed based on these findings.

Technical Solution

In accordance with one aspect of the present invention, the above and other objects can be accomplished by the provision of a battery cell having an electrode assembly including one or more unit cells mounted in a variable cell case in a state in which the electrode assembly is impregnated with an electrolyte, wherein at least one of the unit cells includes a flexible electrode that can be bent or curved, an electrode current collector of the flexible electrode includes a first surface, to which an electrode active material is applied, and a second surface, to which no electrode active material is applied, the second surface being opposite to the first surface, and the second surface is provided with a pattern for improving flexibility of the electrode.

As described above, the battery cell according to the present invention includes the flexible electrode having the electrode current collector configured to have the pattern for improving flexibility of the electrode. Consequently, it is possible to easily bend or curve the battery cell, whereby the battery cell is capable of precisely corresponding to a device having various designs or a flexible device, in which the battery cell is mounted.

In this case, the flexible electrode may be located at the outermost side of the electrode assembly and such that the second surface of the electrode current collector of the flexible electrode contacts the inner surface of the cell case.

In general, when the battery cell is deformed, a portion of the cell case which contacts the outermost surface of the electrode assembly may wrinkle or may be folded. The wrinkles or folded portions formed in the cell case are worn as the result of repetitive deformation of the battery cell, whereby the cell case is broken. As a result, the electrolyte may leak from the cell case, or the insulativity of the cell case may be lowered, which leads to poor safety of the battery cell.

In the battery cell according to the present invention, however, the pattern is formed in the second surface, which is located at the outermost side of the electrode assembly. The second surface is exposed on the variable cell case in the pattern shape. As a result, the surface area of the cell case is larger than the area of the electrode. In a case in which the battery cell is deformed in response to various designs of a device, therefore, it is possible to maximally prevent unintended wrinkles from being formed in the cell case.

In the same manner, the cell case may be provided at a portion of the inner surface thereof with wrinkles or a pattern configured to be brought into tight contact with the pattern formed in the second surface. In this case, tighter contact between the cell case and the second surface is achieved. When the battery cell is deformed, therefore, it is possible to maximally prevent unintended wrinkles from being formed in the cell case.

This pattern assists in deforming the flexible electrode and the electrode assembly. The pattern may have various shapes in order to prevent wrinkles from being formed in the cell case. Specifically, the pattern may be a relief or an intaglio, a porous mesh structure including a plurality of pores, or a structure including a relief or an intaglio and a plurality of pores.

In the pattern structure, the relief or the intaglio or the pores function to reduce stress necessary to deform the flexible electrode. Consequently, it is possible to provide sufficient flexibility necessary to deform the flexible electrode and the electrode assembly including the flexible electrode. In addition, in a case in which the electrode current collector having the pattern formed therein is located at the outermost side of the electrode assembly, as described above, the outer surface of the electrode assembly may be bent by the relief or intaglio pattern or the pores of the porous mesh form. Consequently, the surface area of the cell case becomes larger than the area of the electrode.

Here, the relief or the intaglio may be a pattern formed in the electrode current collector so as to have various shapes. Specifically, the relief or the intaglio may be selected from among a straight shape, a lattice, and a polygon.

The straight shape is a general example of the relief or the intaglio. A plurality of straight relieves or intaglios that are parallel to each other may be formed in the second surface of the flexible electrode. The straight-shaped relief or intaglio enables the flexible electrode to be bent or curved in one direction. On the other hand, the lattice-shaped or polygonal relief or intaglio enables the flexible electrode to be bent or curved in various directions due to a plurality of straight lines constituting the lattice or the polygon.

Meanwhile, in the porous mesh structure, a plurality of pores forms a mesh. The pores may be holes formed vertically through the electrode current collector or recesses formed in the electrode current collector so as to be depressed in a thickness direction. However, the present invention is not limited thereto.

In addition, the porous mesh structure may be configured such that each of the pores has a diameter of 0.1 mm to 1 mm. In a case in which the diameter of each of the pores is greater than the upper limit of the above range, it is not possible to secure mechanical rigidity of the electrode current collector. In addition, electric charges are concentrated on ends of pores having a large diameter, with the result that the resistance in the flexible electrode may be increased, which is not preferable. On the other hand, in a case in which the diameter of each of the pores is greater than the lower limit of the above range, the effect of alleviating stress in the electrode is slight, which is also not preferable.

In addition, the porous mesh structure may be configured such that the pores are arranged at intervals equivalent to 300% to 1000% a diameter of each of the pores. In a case in which the distance between the respective pores is larger than the upper limit of the above range, the flexible electrode includes only a small number of pores, with the result that no desired effect is achieved. On the other hand, in a case in which the distance between the respective pores is smaller than the lower limit of the above range, it is not possible to secure mechanical rigidity of the electrode current collector. In addition, electric charges are concentrated on a plurality of pores, with the result that the resistance in the flexible electrode may be increased, which is not preferable.

Although the pattern may be formed over the entire area of the second surface, the pattern may be formed in a portion of the second surface in consideration of the mechanical rigidity of the electrode current collector and deformation of the flexible electrode. In this case, the portion of the second surface may be the remaining portion of the second surface excluding the area of the second surface near one end of the second surface, at which the electrode tabs of the flexible electrode are located, and the opposite end of the second surface, which is equivalent to 1% to 90% the entire area of the second surface.

Meanwhile, the cell case may be a pouch-shaped case made of a laminate sheet including a metal layer and a resin layer in order to improve flexibility of the battery cell such that the battery cell can be easily mounted in a device having various designs and to bend or curve the surface of the cell case as the bent or curved outer surface of the electrode assembly.

The laminate sheet may be an aluminum laminate sheet. Specifically, the laminate sheet may be configured to have a structure in which an outer resin layer exhibiting high durability is attached to one major surface (the outer surface) of a metal blocking layer and a resin sealant layer exhibiting a high thermal bonding property is attached to the other major surface (the inner surface) of the metal blocking layer.

It is required for the outer resin layer to exhibit high resistance to external environment. Consequently, it is required for the outer resin layer to exhibit more than predetermined tensile strength and weather resistance. For this reason, the outer resin layer may be made of a polymer resin, such as polyethylene terephthalate (PET) or oriented nylon film.

It is required for the metal blocking layer to have a function of increasing the strength of the battery case in addition to a function of preventing the introduction or leakage of foreign matter, such as gas or moisture. To this end, the metal blocking layer may be made of, for example, aluminum.

The resin sealant layer may be made of a polyolefin resin which exhibits a high thermal bonding property (thermal adhesive property) and a low hygroscopic property, which is necessary to restrain permeation of an electrolytic solution, and is not expanded or is not corroded by the electrolytic solution. More specifically, the resin sealant layer may be made of cast polypropylene (CPP).

In general, polyolefin, particularly polypropylene, has low adhesion with metal. For this reason, an adhesion layer may be further disposed between the resin sealant layer and the metal blocking layer so as to improve adhesion between the resin sealant layer and the metal blocking layer and to improve blocking characteristics. The adhesion layer may be made of, for example, urethane, acryl, or thermoplastic elastomer, to which, however, the material for the adhesion layer is not limited.

In a concrete example, the electrode assembly, which is mounted in the cell case in a state in which the electrode assembly is impregnated with the electrolyte, may be configured to have a structure in which two or more unit cells are sequentially stacked or a structure in which two or more unit cells are folded using a long sheet-type separation film.

Each of the unit cells may be a full cell configured to have a structure in which a first electrode, a separator, and a second electrode are sequentially stacked or a bi-cell configured to have a structure in which a first electrode, a separator, a second electrode, a separator, and a first electrode are sequentially stacked. In this case, at least one of the unit cells may be configured to have a structure in which the first electrode or the second electrode is a flexible electrode.

In this specification, the electrodes refer to both a positive electrode, to which a positive electrode active material is applied to a current collector, and a negative electrode, to which a negative electrode active material is applied to a current collector. The first electrode may be a positive electrode or a negative electrode. In this case, the second electrode may be a negative electrode or a positive electrode.

In accordance with another aspect of the present invention, there is provided a battery pack including the battery cell with the above-stated construction as a unit battery.

In accordance with a further aspect of the present invention, there is provided a device including the battery pack as a power source. The device may be selected from among a mobile phone, a portable computer, a smart phone, a tablet PC, a smart pad, a netbook computer, a light electronic vehicle (LEV), an electric vehicle, a hybrid electric vehicle, a plug-in hybrid electric vehicle, and a power storage apparatus.

The structure and manufacturing method of the device are well known in the art to which the present invention pertains, and therefore a detailed description thereof will be omitted.

DESCRIPTION OF DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 3:
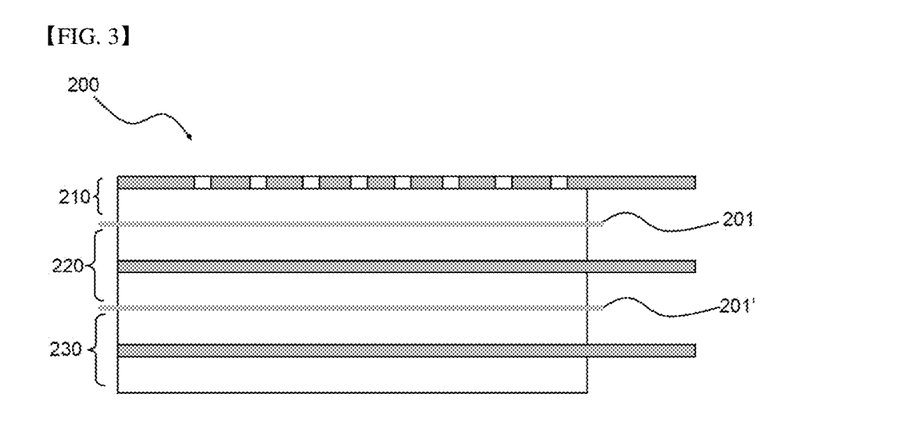
FIG. 3 is a typical view showing an example of a unit cell that constitutes a battery cell according to an embodiment of the present invention.
Figure 4:
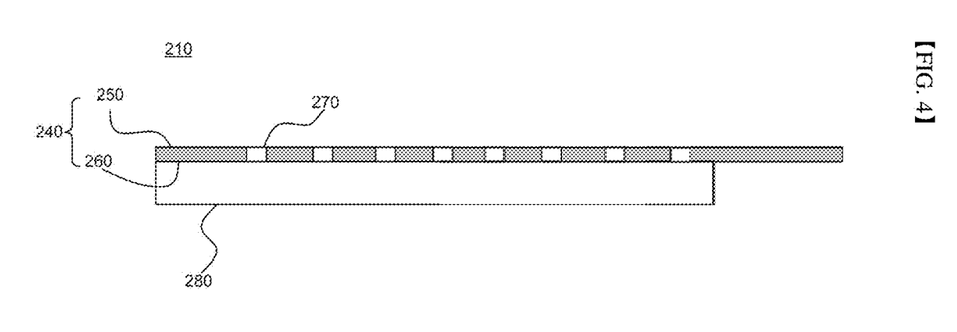
FIG. 4 is a typical view showing a flexible electrode of the unit cell shown in FIG. 3.
Figure 5:
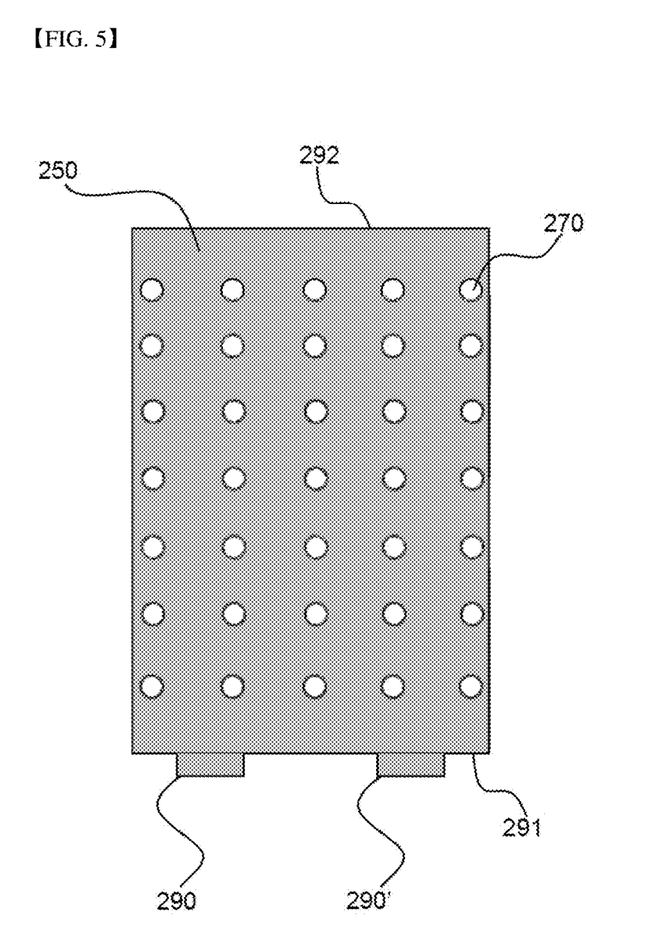
FIG. 5 is a typical view showing a second surface of an electrode current collector of the flexible electrode shown in FIG. 4 when viewed from above.
Figure 6:
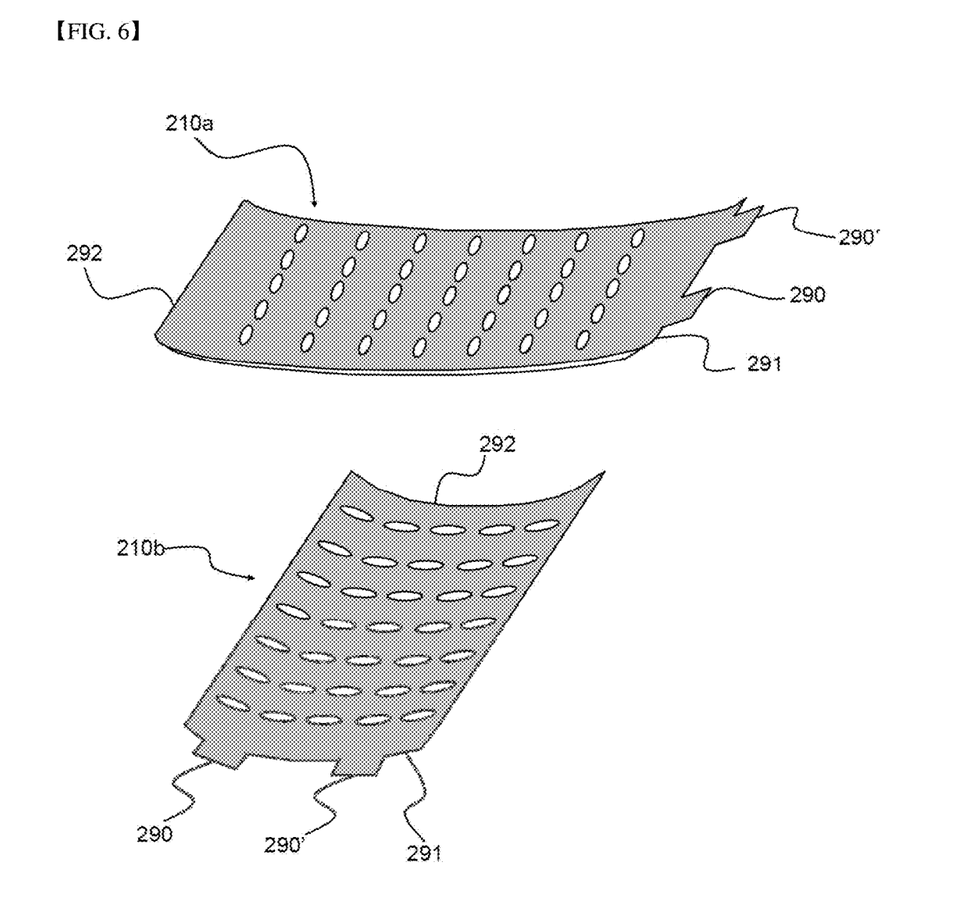
FIG. 6 is a typical view showing a modification of the flexible electrode shown in FIG. 4.

FIG. 3 is a view typically showing an example of a unit cell that constitutes a battery cell according to an embodiment of the present invention, and FIGS. 4 to 6 are typical views showing a flexible electrode of the unit cell shown in FIG. 3 in detail.

Referring to these figures, a unit cell 200 is configured to have a structure in which a first electrode 210, which is a flexible electrode, a separator 201, a second electrode 220, a separator 201', and a first electrode 230 are sequentially stacked.

The first electrodes 210 and 230 have a polarity opposite to that of the second electrode 220. For example, the unit cell 200 may be configured to have a structure in which a first electrode, which is a positive electrode, a separator, a second electrode, which is a negative electrode, another separator, and another first electrode, which is a positive electrode, are sequentially stacked. On the other hand, the unit cell 200 may be configured to have a structure in which a first electrode, which is a negative electrode, a separator, a second electrode, which is a positive electrode, another separator, and another first electrode, which is a negative electrode, are sequentially stacked.

In the following description, one of the first electrodes 210 and 230 that is located at the uppermost end of the unit cell 200, i.e. the first electrode 210, is a flexible electrode. However, the present invention is not limited thereto.

The flexible electrode 210 is located at the uppermost end of the unit cell 200. The flexible electrode 210 includes an electrode current collector 240 and an electrode active material layer 280.

The electrode current collector 240 of the flexible electrode 210 has a first surface 260, to which an electrode active material is applied, and a second surface 250, to which no electrode active material is applied. The electrode active material layer 280 is applied to the first surface 260 such that the electrode active material layer 280 has a predetermined thickness. A porous mesh including pores 270, which extend vertically through the electrode current collector 240, is formed in the second surface 250.

Electrode tabs 290 and 290' are formed at one end of the electrode current collector 240. The pores 270 are formed in the remaining area of the second surface 250 excluding the area of the second surface 250 near one end 291 of the electrode current collector 240, at which the electrode tabs 290 and 290' are located, and the opposite end 292 of the electrode current collector 240, which is equivalent to about 30% the entire area of the second surface 250.

The pores 270 are formed in the second surface 250 in consideration of mechanical rigidity of the electrode current collector 240. In a case in which the pores 270 are formed over the entire area of the second surface 250 of the electrode current collector 240, deformability of the flexible electrode 210 is improved. However, the electrode current collector 240 may be damaged by the deformation of the flexible electrode 210. Furthermore, the contact area between the electrode current collector 240 and the electrode active material layer 280 is reduced, with the result that the electrode active material layer 280 may be easily separated from the surface of the electrode current collector 240. In the present invention, therefore, the mesh is formed over a region to which stress is greatly applied in response to deformation, such as bending or curving, i.e. the middle part of the second surface 250, at which the flexible electrode 210 is mainly deformed.

The flexible electrode may be deformed as shown in FIG. 6. For example, a flexible electrode 210a may be deformed such that the end 291 of the electrode current collector 240, from which the electrode tabs 290 and 290' protrude, and the opposite end 292 are bent upward. In another example, a flexible electrode 210b may be deformed such that the other ends of the flexible electrode 210b, excluding the end 291 of the electrode current collector 240, from which the electrode tabs 290 and 290' protrude, and the opposite end 292, are bent. Although not shown, the flexible electrode may be bent twice, or may be twisted.

Figure 7:
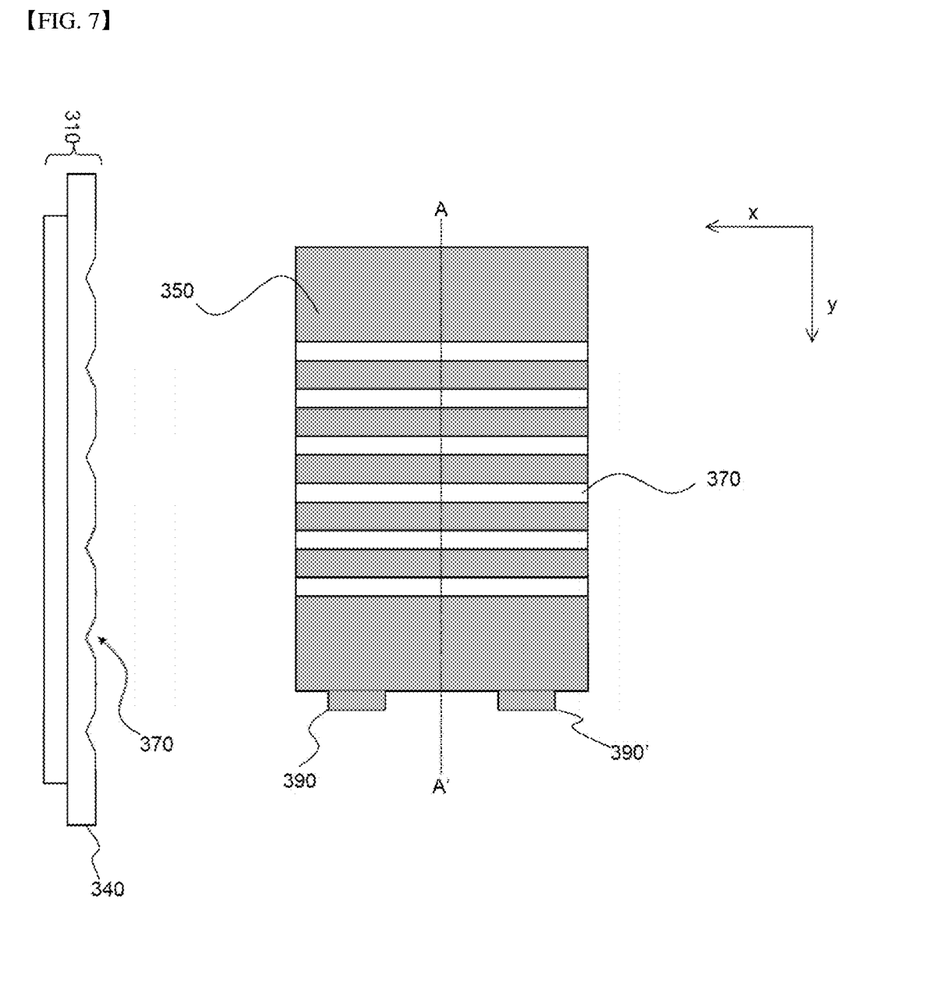
FIGS. 7 to 9 are typical views showing other examples of the flexible electrode.
Figure 8:
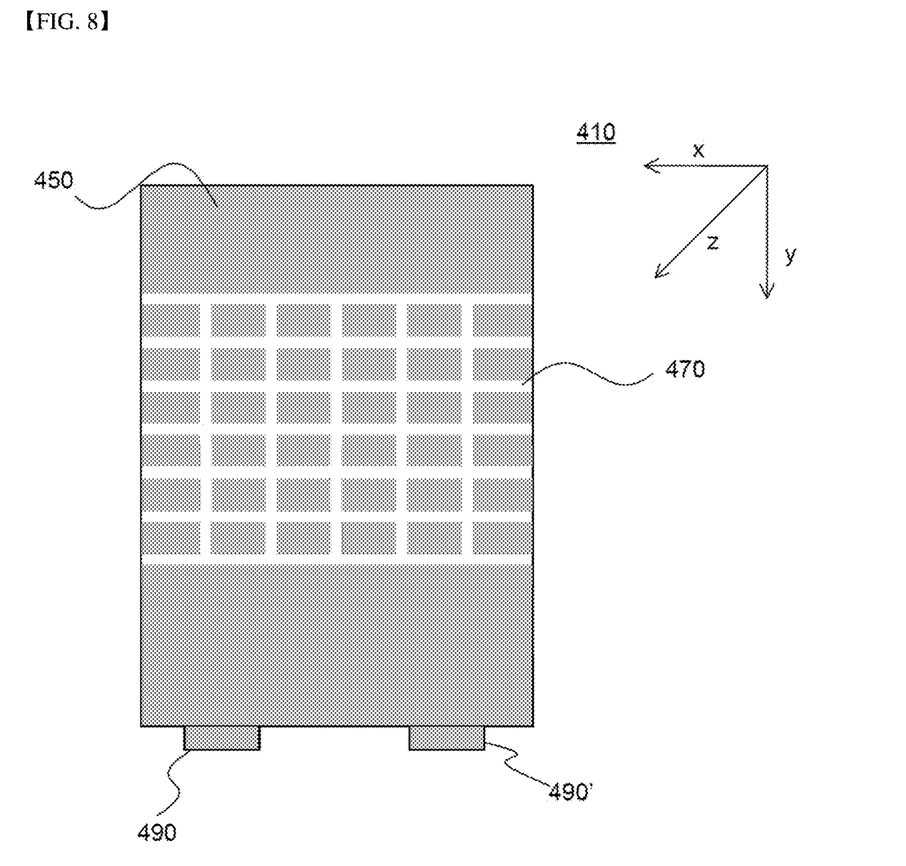
Figure 9:
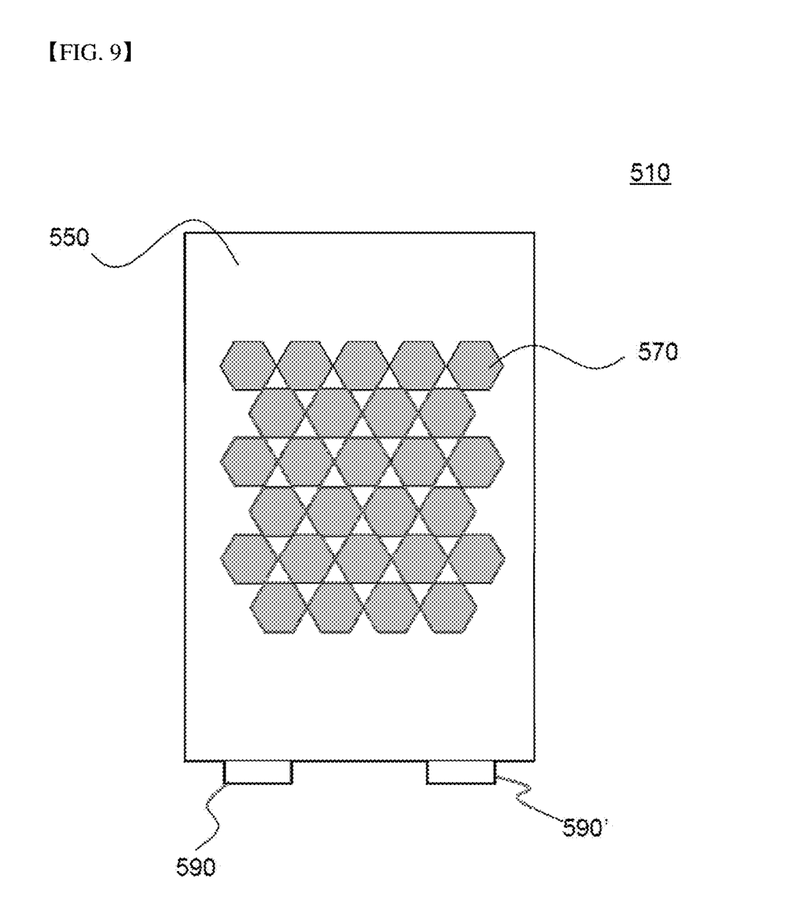

FIGS. 7 to 9 are typical views showing other examples of the flexible electrode.

Referring first to FIG. 7, an flexible electrode 310 is configured such that electrode tabs 390 and 390' are formed at one end of an electrode current collector 340 and such that a plurality of intaglios 370 is formed in the remaining area of a second surface 350 excluding the area of the second surface 350 near one end of the electrode current collector 340, at which electrode tabs 390 and 390' are located, and the opposite end of the electrode current collector 340, which is equivalent to about 40% the entire area of the second surface 350.

The intaglios 370, which form an intaglio pattern, are formed in the second surface 350 of the electrode current collector 340 in straight lines that cross the second surface 350 in a lateral direction (in an x-axis direction). Each of the intaglios 370 is formed in the second surface 350 of the electrode current collector 340 such that each of the intaglios 370 has a shape of "V" in vertical section of the electrode current collector 340. The intaglio pattern 370 enables the flexible electrode 310 to be bent or curved in a longitudinal direction (in a y-axis direction).

Meanwhile, a flexible electrode 410 shown in FIG. 8 is configured such that a lattice-type intaglio pattern 470 is formed in the remaining area of a second surface 450 excluding the area of the second surface 450 near one end of the flexible electrode 410, at which electrode tabs 490 and 490' are located, and the opposite end of the flexible electrode 410, which is equivalent to about 50% the entire area of the second surface 450. The lattice-type intaglio pattern 470 is configured such that intaglios are formed in a portion of the second surface 450 while intersecting each other in the longitudinal direction (in the y-axis direction) and the lateral direction (in the x-axis direction). As compared with the intaglio pattern shown in FIG. 7, the lattice-type intaglio pattern 470 enables the flexible electrode 410 to be bent or curved not only in the longitudinal direction (in the y-axis direction) but also in the lateral direction (in the x-axis direction). Furthermore, the lattice-type intaglio pattern 470 enables the flexible electrode 410 to be bent or curved in a diagonal direction (in a z-axis direction).

Meanwhile, a flexible electrode 510 shown in FIG. 9 is configured such that a polygonal relief pattern 570 is formed in the remaining area of a second surface 550 excluding the area of the second surface 550 near one end of the flexible electrode 510, at which electrode tabs 590 and 590' are located, and the opposite end of the flexible electrode 510, which is equivalent to about 50% the entire area of the second surface 550.

The relief pattern 570 may enable the flexible electrode 510 to be easily bent or curved in the same manner as the patterns 370 and 470 shown in FIGS. 7 and 8.

Figure 10:
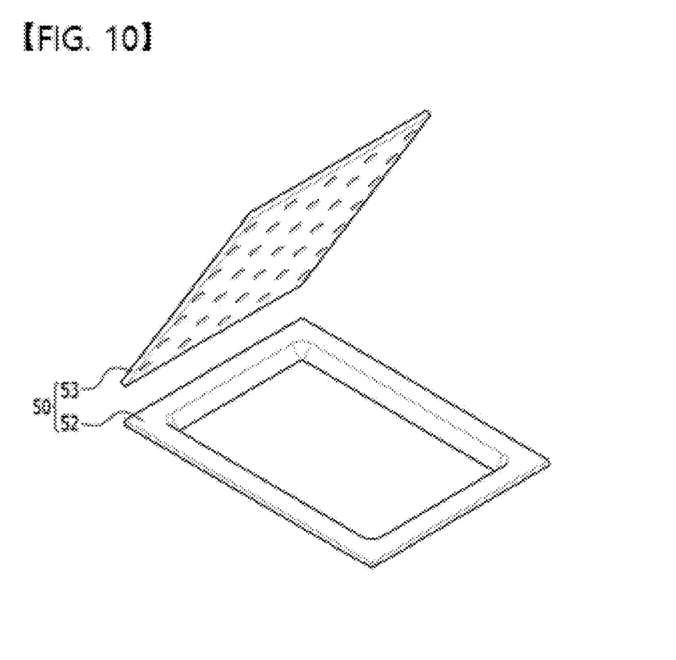
FIG. 10 is a perspective view showing a battery case having a lower case and an upper case that has a pattern configured to be brought into tight contact with the porous pattern formed in the second surface of the flexible electrode.

In FIG. 10, a battery case 50 includes a lower case 52 and an upper case 53 that has a pattern configured to be brought into tight contact with the porous pattern formed in the second surface of the flexible electrode.

As described above with reference to the drawings, the battery cell according to the present invention includes a flexible electrode that exhibits high flexibility and deformability based on the structural features thereof as described above. Consequently, the battery cell may be easily deformed. For example, the battery cell may be easily bent or curved. In addition, it is possible to solve a safety-related problem, which may occur when the battery cell is deformed, base on other features thereof, which will be described hereinafter.

Specifically, the battery cell according to the present invention is configured such that a flexible electrode is located at the outermost side of an electrode assembly and such that a second surface of an electrode current collector of the flexible electrode, in which a mesh is formed, is exposed on a variable cell case. As a result, the surface area of the cell case is larger than the area of the electrode. In a case in which the battery cell is deformed in response to various designs of a device, therefore, a portion of the cell case corresponds to the mesh formed in the second surface, thereby maximally preventing unintended wrinkles from being formed in the cell case.

Consequently, it is possible to effectively prevent dielectric breakdown or electrolyte leakage due to the exposure of a metal layer that is caused by wrinkles formed in the cell case when the battery cell is deformed, thereby securing the safety of the battery.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery cell according to the present invention includes a flexible electrode having an electrode current collector configured to have a pattern structure for improving flexibility of the electrode. Consequently, it is possible to easily bend or curve the battery cell, whereby the battery cell is capable of precisely corresponding to a device having various designs or a flexible device, in which the battery cell is mounted.

In addition, the battery cell according to the present invention is configured such that a flexible electrode is located at the outermost side of an electrode assembly and such that a second surface of an electrode current collector of the flexible electrode, in which a pattern is formed, is exposed on a variable cell case. As a result, the surface area of the cell case is larger than the area of the electrode. In a case in which the battery cell is deformed in response to various designs of a device, therefore, it is possible to maximally prevent unintended wrinkles from being formed in the cell case.

The invention claimed is:

1. A battery cell having an electrode assembly comprising two or more unit cells mounted in a variable cell case in a state in which the electrode assembly is impregnated with an electrolyte, wherein at least one of the unit cells comprises a flexible electrode that can be bent or curved, an electrode current collector of the flexible electrode comprises a first surface, to which an electrode active material is applied, and a second surface, to which no electrode active material is applied, the second surface being opposite to the first surface, and the second surface is provided with a pattern for improving flexibility of the electrode, wherein the pattern is a relief or an intaglio, wherein the relief or the intaglio is a polygon, wherein the flexible electrode is located at an outermost side of the electrode assembly such that the pattern of the second surface of the electrode current collector contacts an inner surface of the cell case, and wherein only the flexible electrode at the outermost side has a surface provided with a pattern.

2. The battery cell according to claim 1, wherein the electrode assembly is configured to have a structure in which two or more unit cells are sequentially stacked or a structure in which two or more unit cells are folded using a long sheet-type separation film.

3. The battery cell according to claim 1, wherein each of the unit cells is a full cell configured to have a structure in which a first electrode, a separator, and a second electrode are sequentially stacked or a bi-cell configured to have a structure in which a first electrode, a separator, a second electrode, a separator, and a first electrode are sequentially stacked.

4. The battery cell according to claim 3, wherein at least one of the unit cells is configured to have a structure in which the first electrode or the second electrode is a flexible electrode.

5. The battery cell according to claim 1, wherein the pattern is formed in a portion of the second surface.

6. The battery cell according to claim 5, wherein the portion of the second surface is a remaining portion of the second surface excluding an area of the second surface near one end of the second surface, at which electrode tabs of the flexible electrode are located, and the opposite end of the second surface, which is equivalent to 1% to 90% an entire area of the second surface.

7. The battery cell according to claim 1, wherein the cell case is a pouch-shaped case made of a laminate sheet comprising a metal layer and a resin layer.

8. A battery pack comprising a battery cell according to claim 1 as a unit battery.

9. A device comprising a battery pack according to claim 8 as a power source.

10. The device according to claim 9, wherein the device is selected from among a mobile phone, a portable computer, a smart phone, a smart pad, a tablet PC, and a netbook computer.

11. The battery cell according to claim 1, wherein the pattern is formed in a portion of the second surface excluding a non-patterned area of the second surface near one end of the second surface, at which electrode tabs of the flexible electrode are located, and the opposite end of the second surface, wherein the non-patterned area is 30% or more of the entire area of the second surface.

12. The battery cell according to claim 11, wherein the non-patterned area is 40% or more of the entire area of the second surface.

13. The battery cell according to claim 12, wherein the non-patterned area is 50% or more of the entire area of the second surface.

14. A battery cell having an electrode assembly comprising two or more unit cells mounted in a variable cell case in a state in which the electrode assembly is impregnated with an electrolyte, wherein at least one of the unit cells comprises a flexible electrode that can be bent or curved, an electrode current collector of the flexible electrode comprises a first surface, to which an electrode active material is applied, and a second surface, to which no electrode active material is applied, the second surface being opposite to the first surface, and the second surface is provided with a pattern for improving flexibility of the electrode, wherein the pattern is a porous mesh structure comprising a plurality of pores, and wherein the pores of the porous mesh structure are recesses formed in the electrode current collector so as to be depressed in a thickness direction without extending through the entire thickness direction of the electrode current collector, wherein the flexible electrode is located at an outermost side of the electrode assembly such that the pattern of the second surface of the electrode current collector contacts an inner surface of the cell case, and wherein only the flexible electrode at the outermost side has a surface provided with a pattern.

15. The battery cell according to claim 14, wherein the porous mesh structure is configured such that each of the pores has a diameter of 0.1 mm to 1 mm.

16. The battery cell according to claim 14, wherein the porous mesh structure is configured such that the pores are arranged at intervals equivalent to 300% to 1000% a diameter of each of the pores.

17. The battery cell according to claim 14, wherein the cell case is provided at a portion of an inner surface thereof with a porous pattern configured to be brought into tight contact with the pattern formed in the second surface.

* * * * *